Figure 1:
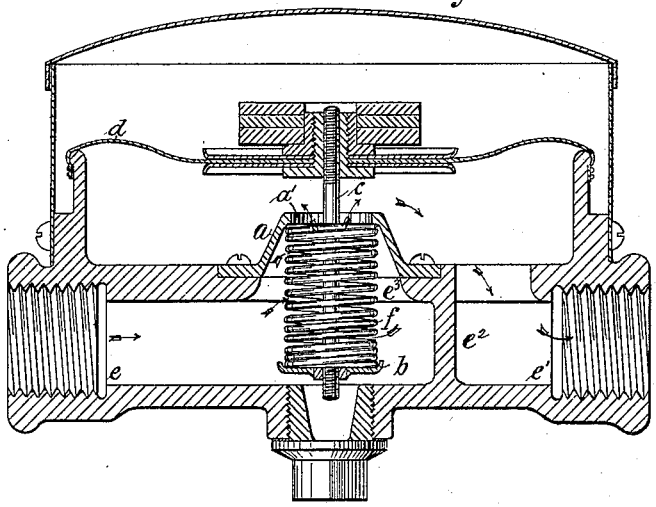

(No Model.) 2 Sheets—Sheet 1.

O. PINTSCH.
FLUID PRESSURE REGULATOR.

No. 337,431. Patented Mar. 9, 1886.

Attest:
C. Mo. Gallaher
P. M. Knobloch.

Inventor:
Oskar Pintsch
per Henry Orth
his atty.

(No Model.) 2 Sheets—Sheet 2.

O. PINTSCH.
FLUID PRESSURE REGULATOR.

No. 337,431. Patented Mar. 9, 1886.

Attest:
C. M. Gallaher
P. M. Knobloch

Inventor:
Oskar Pintsch
per Henry Orth
his atty.

N. PETERS. Photo-Lithographer. Washington. D. C.

UNITED STATES PATENT OFFICE.

OSKAR PINTSCH, OF BERLIN, GERMANY.

FLUID-PRESSURE REGULATOR.

SPECIFICATION forming part of Letters Patent No. 337,431, dated March 9, 1886.

Application filed August 20, 1885. Serial No. 174,888. (No model.) Patented in Belgium August 4, 1885, No. 69,823, and in England August 4, 1885, No. 9,303.

*To all whom it may concern:*

Be it known that I, OSKAR PINTSCH, (doing business under the firm of JULIUS PINTSCH, manufacturer,) a subject of the King of Prussia, residing at Berlin, Prussia, German Empire, have invented certain new and useful Improvements in Fluid-Pressure Regulators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in regulators for gas and other fluids; and it consists in the combination of parts hereinafter described.

In the regulators of this class now in use, valves, cocks, and the like, of various forms, have been used. These devices have been operated by means of membranes or diaphragms provided with rods or equivalent devices acted upon by the liquid or gas, thereby moving the membrane upward or downward, according as the pressure of the liquid or gas increases or decreases.

In the employment of these regulators great annoyance is caused, due to the friction produced by the moving parts, which interferes with the proper working of the apparatus. In order to overcome all objections I employ coiled springs made from metallic wire or rod, the spaces between the convolutions of the springs serving as a passage-way for the gas or other fluid, said springs being connected in any suitable manner with a membrane or similar device operated upon by the gas or liquid, so that when the pressure of the latter is increased or diminished the membrane or other device is raised or lowered, thereby compressing or spreading the spring employed. The convolutions of the spring are thereby brought closer together or spread farther apart and the flow of the gas or liquid therethrough retarded or entirely cut off or increased. According to this construction I always obtain a uniform flow of the gas or other fluid, no matter how often or to what extent its pressure may vary.

In carrying out my invention many forms of apparatus may be employed and the details thereof may be varied; but it will be understood that I do not limit myself to the exact construction of apparatus, nor to the exact details thereof.

In the accompanying drawings, I have shown two forms of apparatus, either of which may be successfully employed for carrying out my invention.

Figure 2:
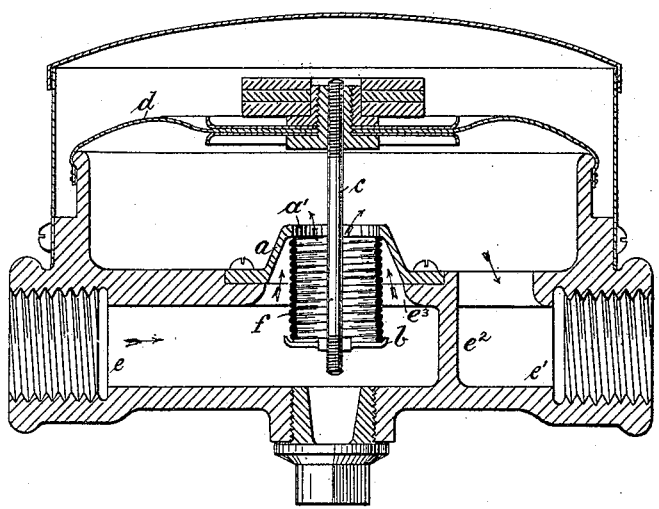
Figure 3:
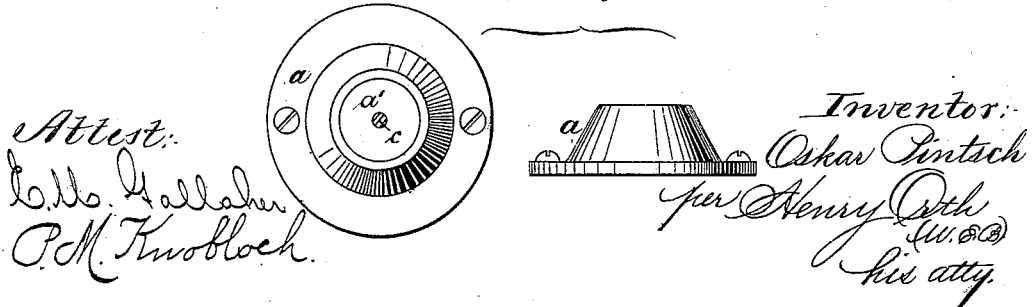
Figure 4:
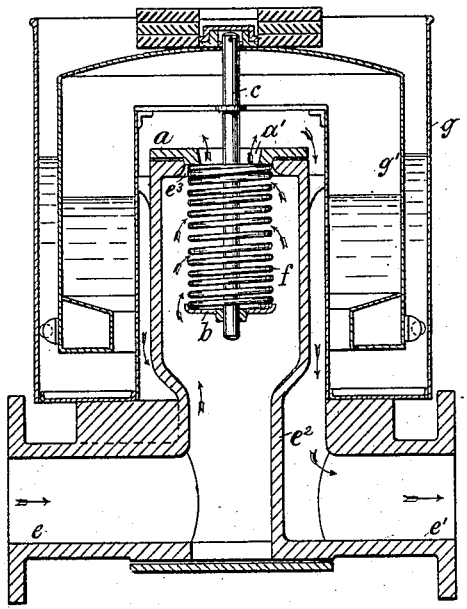
Figure 5:
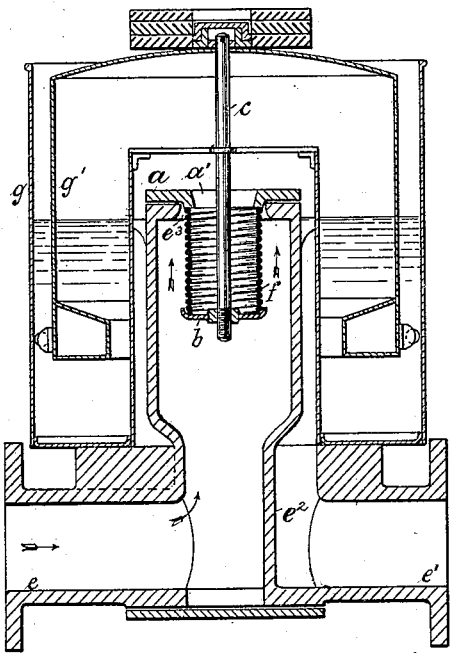

Figures 1 and 2 illustrate vertical sections of one form of the apparatus, the parts being shown in different positions. Figs. 4 and 5 are like views of another form of the apparatus, the parts being in different positions. Fig. 3 shows, by a side and a plan view, the bearing-ring for the spring.

Like letters of reference indicate like parts in the several figures of the drawings.

Referring to the drawings, and more particularly to Figs. 1 and 2. $f$ indicates the regulating-spring, which in this instance is a cylindrical coiled spring of metallic wire or rod, one end of which is secured, either by soldering or otherwise, to a ring, $a$, which is bolted or otherwise secured to some stationary portion of the apparatus, in this instance to the pipe or conductor for the gas or other fluid. This ring $a$ is provided with an opening, $a'$, in line with and of a diameter about equal to that of the spring. The lower end of the spring bears against a plate or disk, $b$, which is screwed and adapted to run upon the lower threaded end of a rod, $c$, which rod passes up through the interior of the spring, and its upper end is connected in any suitable manner with a flexible diaphragm, $d$, secured by bolts or otherwise to a projecting flange of the fluid-conductor.

It will be seen that by screwing up the plate or disk $d$ on the rod $c$ the tension of the spring is increased, and that by lowering the disk on the rod the tension of the spring is lessened.

$e$ indicates the inlet end of the conductor or pipe for the gas or other fluid, and $e'$ the outlet end of the same. The construction of this conductor is such that the gas or other fluid cannot pass directly from the end $e$ to that $e'$, a vertical wall or partition, $e^2$, accomplishing this purpose, while an opening, $e^3$, is provided, through which extends the spring $f$.

It will be seen that by the construction above described the gas or other fluid entering at $e$ passes up through the opening $e^3$ and through the convolutions of the spring $f$ and opening $a'$ in the ring $a$, and then out through the exit $e'$, all the gas passing through the apparatus being caused to flow through the convolutions of the spring $f$. When the normal pressure of the gas or other fluid increases, for instance, this pressure will be exerted upon the membrane or diaphragm $d$ and will raise the same. This causes the rod $c$ and disk $b$ to be raised, and the spring is thereby compressed, thus decreasing the distance between the convolutions of the spring, the flow of the gas being thereby partly checked or entirely cut off, according to the degree of compression of the spring. On the other hand, if the pressure of the gas or other fluid decreases, the spring will be free to expand, increasing the space between its convolutions and allowing a larger flow of the gas or other fluid.

Fig. 1 shows the parts in the position they assume when the pressure of the gas or other fluid is normal, and Fig. 2 shows the parts in the position they assume when the pressure of the gas or other fluid exceeds the normal pressure, the arrows indicating the course of the fluid through the apparatus.

Referring to Figs. 4 and 5, the upper end of the rod $c$ is connected with the upper end of the vessel $g'$, which is free to ride up and down within the casing $g$ of the apparatus.

Within the vessel $g'$ is placed a quantity of a liquid, while a quantity of the same is placed within the casing $g$.

The arrangement of the spring $f$, disk $b$, rod $c$, ring $a$, and the conductor for the fluid is similar to the arrangement shown in Figs. 1 and 2.

The operation of this apparatus is identical with that described with relation to Figs. 1 and 2, the pressure of the gas or other fluid acting upon the vessel $g'$, to raise or allow the lowering of the same, as the case may be, which in this manner compresses or expands the spring to regulate the flow of the fluid.

Fig. 4 shows the parts in the position they assume when the pressure of the fluid is normal, and Fig. 5 shows the parts in the position they assume when the pressure of the fluid exceeds the normal pressure, the arrows indicating the course of the fluid through the apparatus.

In Fig. 3 I have shown a side view and a top plan view of the bearing-ring $a$, showing the rod $c$ (in section) passing through the opening $a$ in the ring.

In order to prevent the corrosion of the spring, or any detrimental action thereon by the gas or other fluid passing through the apparatus, I prefer to envelop said spring in a metallic or other covering.

It will be understood that the spring may be of a conical or other form, instead of cylindrical.

What I claim is—

1. In a gas or other fluid regulator, the combination of a coiled spring, through the convolutions of which the fluid passes, with means connected with said spring for varying the distance between the convolutions of the same, according as the pressure of the fluid increases or decreases, substantially as described.

2. In a gas or other fluid regulator, the combination of a coiled spring, through the convolutions of which the fluid passes, and means for adjusting the tension of said spring, with means connected with the spring for varying the distance between the convolutions of the same, according as the pressure of the fluid increases or decreases, substantially as described.

3. In a gas or other fluid regulator, a coiled spring, one end of which is fixed and the other end bearing upon a disk mounted on one end of a rod, said rod being connected at its other end to a flexible diaphragm, said parts operating substantially as described.

4. The combination of a coiled spring fixed at one end, bearing at its other end upon a disk adjustably mounted upon one end of a rod, said rod being connected at its other end to a flexible diaphragm, said parts operating substantially as described.

5. In a gas or other fluid regulator, the combination of a coiled spring fixed at one end to a bearing-ring on the fluid conductor, and at its other end bearing upon a disk mounted on one end of a rod, said rod being connected at the other end to a flexible diaphragm, also secured to the fluid-conductor, said parts operating substantially as described.

6. In a gas or other fluid regulator, the combination, with the conductor for the fluid having inlet and outlet ports, and having the dividing-wall $e^2$ and opening $e^3$, of a coiled spring connected at one end to a bearing-ring on the conductor, and at its other end bearing upon a disk mounted on one end of a rod, said rod being connected at its upper end to a flexible diaphragm, also secured to the fluid-conductor, said parts operating substantially as described.

In testimony whereof I affix my signature in presence of two witnesses.

OSKAR PINTSCH.

Witnesses:
PAUL BAER,
B. ROI.